Dec. 7, 1937.  C. J. MEYERS  2,101,084
CONSTANT SPEED CONTROLLED DRIVE
Filed Aug. 11, 1934   2 Sheets-Sheet 1

Charles J. Meyers
INVENTOR
BY
ATTORNEY

Dec. 7, 1937.   C. J. MEYERS   2,101,084
CONSTANT SPEED CONTROLLED DRIVE
Filed Aug. 11, 1934   2 Sheets-Sheet 2
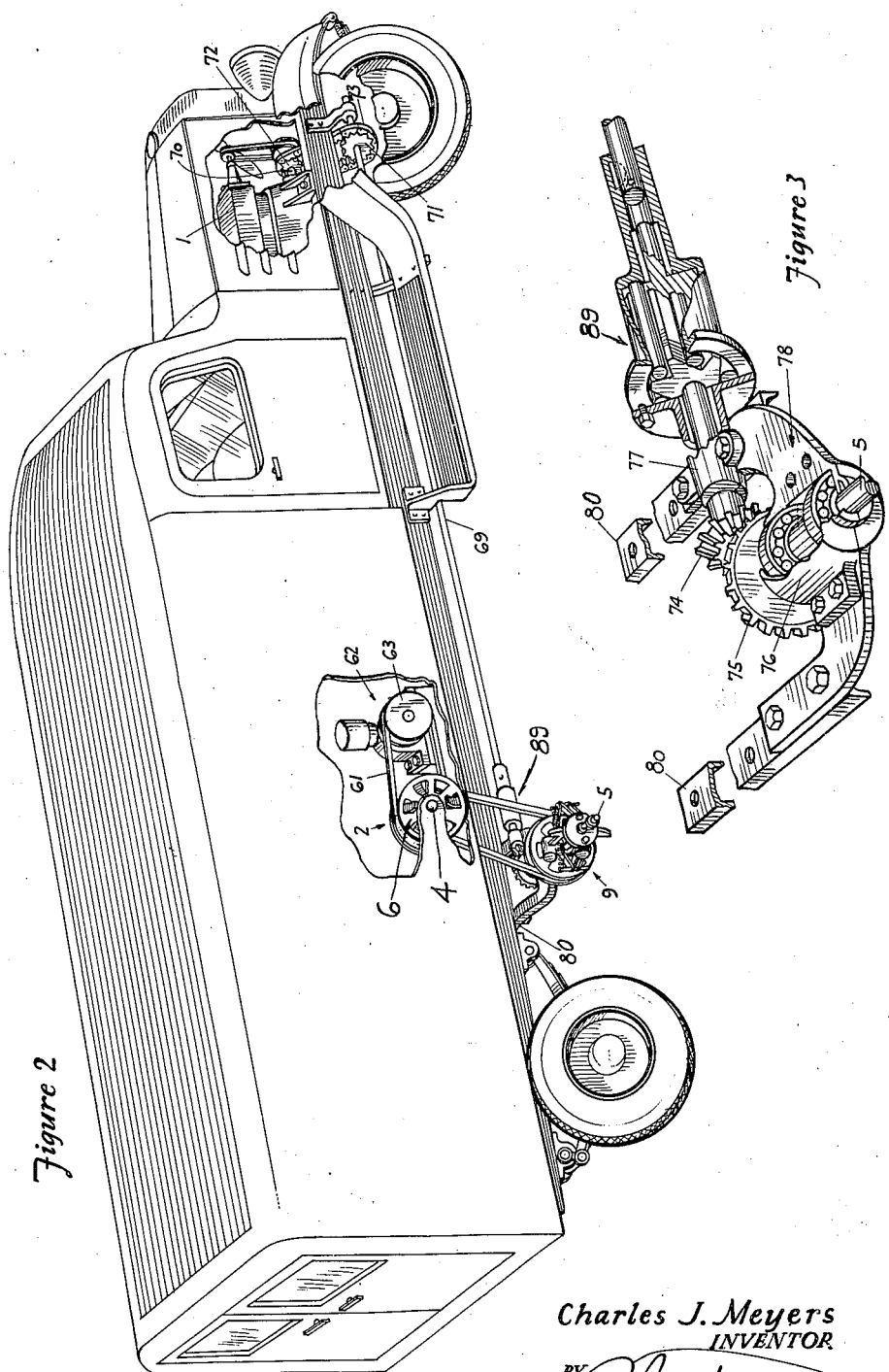

Patented Dec. 7, 1937

2,101,084

UNITED STATES PATENT OFFICE 2,101,084

CONSTANT SPEED CONTROLLED DRIVE

Charles J. Meyers, Wilmar, Calif., assignor to William F. Hackett, Los Angeles, Calif.

Application August 11, 1934, Serial No. 739,430

25 Claims. (Cl. 74—230.17)

This invention relates to improved mechanism wherein a prime mover, the speed of which is constantly varying, thru the medium of an automatically controlled speed changing apparatus, drives secondary apparatus at approximately constant speed.

A general object of the invention is to provide in apparatus of the above mentioned character, mechanism which is simple, efficient, and particularly well adapted for use on mobile refrigerator equipment or in other mechanisms wherein it is desired to maintain a constant speed in a driven shaft.

One of the objects of the invention is to provide a construction whereby the maintenance of this constant speed is accomplished thru the employment of an automatically controlled speed changing mechanism.

A further object of the invention is to provide mechanism connective to an automobile or truck engine whereby both the truck and the refrigerating equipment may be driven simultaneously and in such a manner that, tho the speed of the truck engine may vary, the speed of the refrigerating equipment will be kept constant and that constancy of speed maintained thru the medium of mechanism whose automatism is controlled by centrifugal force.

A further object of the invention is the provision of a constant speed controlled drive including a driving and driven pulley, power transmitting means engageable with the pulleys, and means for automatically varying the operative diameters of both the pulleys in unison.

The invention consists of novel parts and novel combinations of parts to be hereinafter described, all of which contribute to produce an efficient apparatus which has been produced as the result of actual tests. Hence a practical showing of the preferred embodiment is disclosed in the following specification and the broad scope thereof pointed out in what is claimed.

In the drawings:

Figure 2 is a perspective showing the improved mechanism in its relation to a truck which is equipped with refrigerating equipment.

Figure 3 is a fragmentary perspective drawing showing the overrunning clutch or free wheeling unit thru the medium of which the constant speed controlled drive is operated, and other mechanism relating the clutch and the drive and means by which the drive is attached to the truck.

Figure 1:
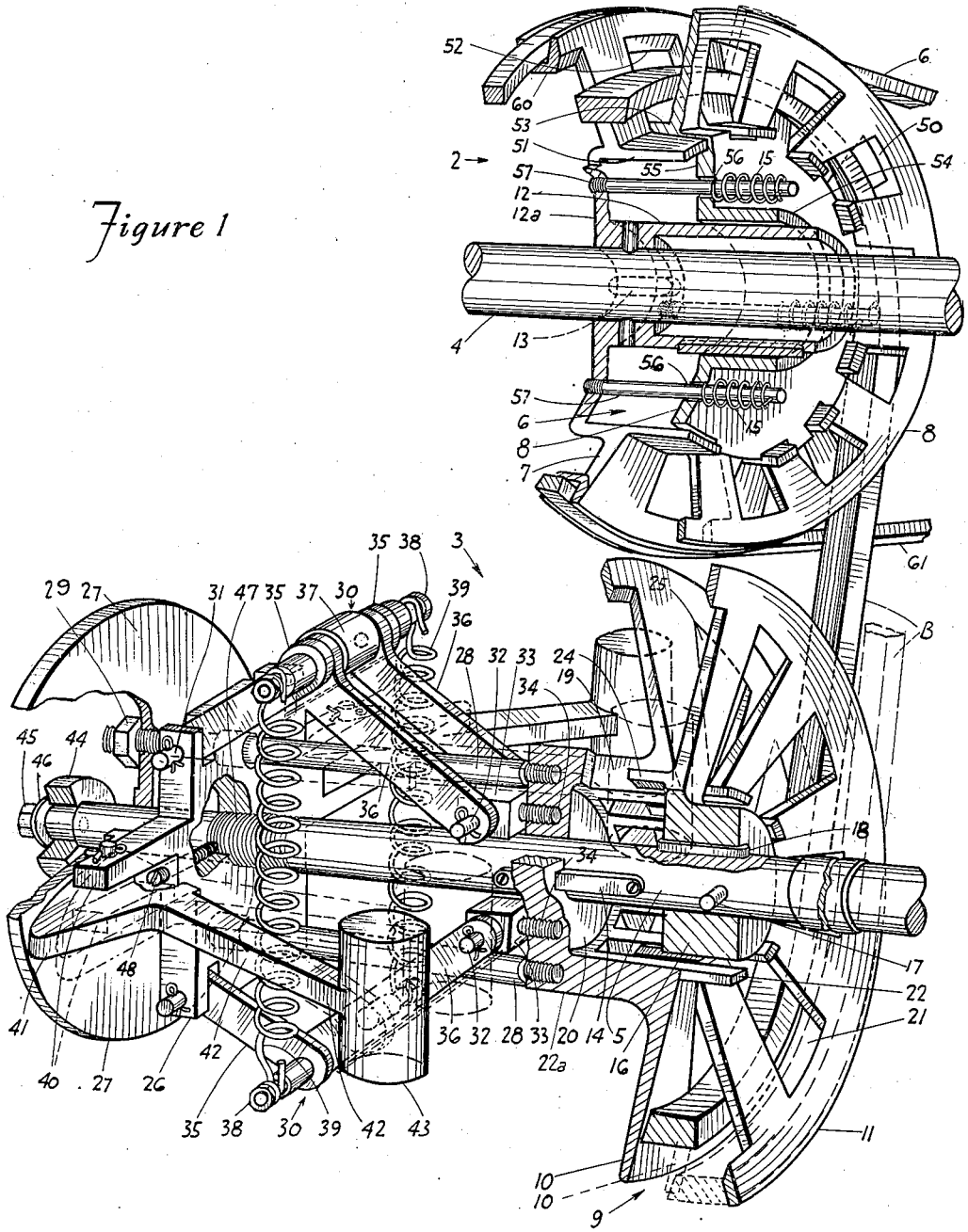
Figure 1 is a perspective view of the improved drive, some parts of which are shown in section and others are broken away to disclose underlying structures.

Referring in detail to the drawings the numeral 1 indicates the constantly varying speed prime mover which drives at approximately constant speed the secondary or auxiliary apparatus 2 thru the intervening speed changing mechanism 3. The secondary apparatus is mounted on a driven shaft 4 and the intervening mechanism is mounted on a drive shaft 5. The secondary apparatus 2 comprises a pulley or actuator 6 consisting of a pair of members 7 and 8, and the mechanism 3 comprises a pulley or actuator 9 consisting of a pair of members 10 and 11. The member 7 is rigidly mounted on the driven shaft 4, and the member 11 is rigidly mounted on the drive shaft 5.

Members 8 and 10 are relatively axially movable of their respective shafts to vary the operative diameters of the pulleys about which the belt B is looped. The member 8 is slidably mounted on the hub 12 of the member 7 and keyed against free idling by means of the key 13 whereby the members 7 and 8 may rotate in unison, and the member 10 is slidably mounted on the drive shaft 5 and keyed against free idling by means of the key 14. The fact that the member 10 is keyed to the shaft 5 and the member 11 is rigidly mounted on the same shaft insures a relative rotative relation of both of the latter members at all times.

The operative diameters of the pulleys 6 and 9 about which the belt B operates, varies accordingly as the speed of the engine changes. These changes in engine speed vary from 200 R. P. M. to 2,000 R. P. M. though refrigerating apparatus operates best around 400 R. P. M. with as little change in speed as possible. As the engine speed varies, the controlling of the speed of the pulley 6, whereby it is maintained constant, is accomplished thru the medium of the driving or controlling pulley 9, whose operative diameter is automatically governed by parts actuated by centrifugal force.

The operative diameter of the pulley 6 is also automatically controlled. In this pulley the movable member 8 approaches the fixed member 7 under the action of the springs 15 as the engine accelerates to decrease the diameter of the driving pulley 9.

The pulley 9, being the master or prime mover pulley and centrifugally controlled, decreases its operative diameter as the prime mover or engine speeds up, and increases its operative diameter as the speed of the prime mover decreases, that is to say the member 10 will move farther from or closer to the member 11 as the engine is accelerated or decelerated as the case may be.

This change in diameter of the drive pulley 9 is compensated for by an inverse change in the operative diameter of the driven pulley 6 in order that the belt be kept tight and a gear up and down action be produced also.

The members 7 and 8 and the members 10 and 11 which form the component parts of the pulleys 6 and 9 are skeletonized so that they may intermesh with each other differentially as the movable members 8 and 10 recede and approach the stationary members 7 and 11.

Describing more in detail the construction, mounting and operation of the broadly conical discs 10 and 11, these discs are assembled concentrically of the shaft 5 adjacent to each other, thereby forming, by means of their diverging peripheral portions, around the shaft 5 an annular V-shaped trough or belt race groove the width of which is determined by the distance apart at which said discs 10 and 11 are automatically maintained.

The disc 11 is provided with a hub portion 16 which, by means of pin 17, is fixed to the shaft 5, but the disc 10 is slidable longitudinally of said shaft. In order to provide for the slidable mounting of said disc 10 upon its shaft, said disc is furnished with a hub 19 and a hub flange 20, said flange 20 having a keyway thru it to receive slidably the key 14 already mentioned.

The disc 11 has thru it a series of radially extending spaced openings 21, and the hub portion of the disc 10 is furnished with a corresponding series of fingers 22, the width of said fingers being substantially equal to the width of the inner end of each opening 21. Said fingers 22 are of sufficient lengths to insure that they at no time can be completely withdrawn from the openings 21.

The set of fingers 22 of the disc 10 are continuations of extensions 22a, and the disc 10 is formed upon and preferably integral with the outer portions of said extensions 22a. Said extensions together with the fingers 22 have a telescopic relation to the disc 11 through which they extend.

The non-slidable disc 11 is likewise provided with a series of circumferentially arranged fingers 24, these fingers projecting thru the inner ends of the radially extending opening 25 provided for them in the slidable disc 10.

Each set of fingers 22 and 24 is spaced concentrically around the shaft 5 at a sufficient distance therefrom to determine the minimum diameter of the pulley construction afforded by the combined discs 10 and 11 so that, in no case will the two discs 10 and 11 be drawn apart sufficiently to permit the belt B to approach nearer to the shaft 5 than the distance of said fingers therefrom.

Means will now be described whereby a centrifugally controlled force is applied to the disc 10 to regulate its distance from disc 11. Upon the left hand portion of the shaft 5 as viewed in Fig. 1 is fixed a spider 26 and farther to the left upon said shaft is slidably mounted an operating disc 27. The hub portion 20 of the disc 10 has tapped into its left end a pair of oppositely disposed guide rods 28. Said rods extend parallel to the shaft 5 and have their left ends screwed onto or otherwise fixed to the operating disc 27. A preferred way of securing said rods to said disc is to provide locking nuts 29 to hold them in the desired fixed positions. From the construction just described it will be seen that the operating disc 27 and the pulley disc 10 are held in fixed relation to each other to slide somewhat along the shaft 5 as a fixed unit.

Two cooperating diametrically opposed toggle members 30 are provided as a part of the governor mechanism which automatically regulates the position of the disc 10 in relation to the disc 11. Each of these toggle members is pivotally connected by means of a pin 31 with the spider 26 at the two ends of the toggle construction and at the other end of the toggle construction each of said members is pivotally connected by means of a pin 32 with a block 33. Two blocks are thus provided and each of said blocks is, by means of a screw threaded stud 34, secured to the adjacent portion of the hub 20. By preference and as shown each toggle member is provided with a rear pair of spaced arms 35, and a like pair of front arms 36, the arms of each pair passing astride the guide rods 28 in order to afford a compact non-interfering mechanism.

Each toggle member 30 is shown furnished with a central spacer member 37 into the opposite ends of which are tapped bolts 38. Said bolts are connected to the ends of the two spiral tension springs 39 which tend to draw the central portions of the toggle members toward each other. The spider 26 is provided at each side with a pair of spaced arms 40 and each of these pairs of arms serve to pivotally support a cam 41. Said cam 41 is provided with an arm 42 which at its free end supports a weight 43. These parts are so related to each other that when the speed of the prime mover is accelerated centrifugal force will cause the cam 41 at each side of the device, under the urge of its weight 43, to press upon the operating disc 27 and thereby, against the opposition of springs 39, move said disc together with the pulley disc 10 connected therewith to a greater distance from its companion disc 11, thereby widening the pulley trough between said disc 10 and 11 and decreasing the effective diameter of the pulley to compensate for the increase in speed. The opposite action occurs when the speed of the prime mover is decelerated.

As viewed in Figure 1 the left hand end of the shaft 5 is diametrically reduced and the reduced portion thus provided has secured thereto a stop collar 44 by means of a cap screw 45, a washer 46 desirably being interposed between said collar and the head of said screw.

Describing certain details of the spider 26, said spider is internally screw threaded in order to screw it onto a threaded part 47 of the shaft 5 provided therefor. Said spider is also provided with a pointed set screw 48 which may be screwed against said thread part to aid in securing the spider in a fixed relation to said shaft.

The variable pulley construction shown in the upper portion of Figure 1 comprises the aforementioned pulley disc members or skeleton discs 7 and 8, the latter disc having through it a series of circumferentially arranged tapered openings 50. The narrow end of each of said openings is nearest the center of shaft 4. The companion disc 7 is provided with a corresponding number of fingers 51 which are of a flat character and are arranged to slide back and forth through the inner portions of openings 50 as the said pulley members 7 and 8 vary in their distance from each other as presently to be described. At times the pulley members 7 and 8 are sufficiently close to each other to make it impossible for the belt B, which is of a pre-determined width, to be wedged in between the diverging flange portions of the pulley members to a sufficient extent to reach the fingers 51; but at other times said pulley members separate sufficiently to allow said fingers to outline the diameter of the pulley construction which is driven by belt B.

The fingers 51 are carried by a radial flange 12a which extends from one end of the hub shell 12 already referred to. The disc 7 also has through it a circumferential series of openings 52 which are complementary to the openings 50 in the disc 8, and the disc 8 has a series of fingers 53 to cooperate with said openings 52.

The hub portion 12 of the disc 7 forms a support upon which is slidably mounted a hub portion 54 with which the disc 8 is provided. Said hub portion 54 is connected with the exterior portion of the disc 8 by means of a radial flange 55. Said flange has through it a circumferentially arranged series of openings 56 which slidably receive screw rods 57, each of these rods having one end screwed into the radial flange 12a of the hub 12. On the opposite end portion of the screw rod 57 is coiled the aforementioned spring 15, the outer end of said spring being secured to said rod, and its inner end abutting against the flange 55 of the disc 8. On account of this arrangement the two discs 7 and 8 are adapted to yield to each other when the belt B grips them with sufficient force, but will reassume a nearer position to each other when the pressure from said belt is diminished.

The pulley disc 7 is furnished with a peripheral groove 60 to receive a power transmission belt 61 which operates the refrigerating apparatus 62, (see Figure 2).

In Figs. 2 and 3 are shown the means whereby the driving shaft 5 is operatively connected with the prime mover. For this purpose a truck shaft 69 is operatively connected with the crank shaft 70 by means of gears 71 and 72 and the sprocket chain 73. Said shaft is extended toward the rear end of the vehicle at which point it has fixed to it a bevel gear 74 which meshes with another bevel gear 75. The latter bevel gear being fixed to the aforementioned shaft 5. The adjacent end portions of the shafts 5 and 69 are respectively provided with suitable bearings 76 and 77 and these bearings are shown supported by an extensible U-shaped bracket 78. Each arm of said bracket is shown bolted to a channel iron bar 80, these channel iron bars being provided with bolt holes to adapt them for being bolted to the underside of the vehicle frame 81.

In Figure 3 the parts are shown on a large scale and the shaft 5 is broken away close to its bearing 76 in order to contract the view. In Figure 2 however the shaft 5 is more completely shown and the pulley construction 9, which is shown in detail in Figure 1 is shown mounted upon said shaft. Also in the latter view the belt B is shown connecting said pulley structure 9 with the pulley structure 2 shown in detail in Figure 2. In Figure 2 is also shown a portion 62 of the refrigerating apparatus having a pulley 63 which is driven by said belt 61.

In Figures 2 and 3 is shown mounted on the truck shaft 69, at a point adjacent the bearing 77, an overrunning clutch or free wheeling unit 89.

Operation

Whenever the engine 1 of the vehicle is in operation the shaft 69 will be rotated and through the gears 74 and 75 the shaft 5 will also be kept in rotation, together with the governor controlled two part driving pulley 9 shown in Figure 1. Whenever the engine is operating at a relatively low speed the discs 10 and 11 which make up the pulley construction 9 will remain in close contact to each other thus causing the belt B to be held out into the position shown in said Figure 1, in which position it is held radially spaced away from the fingers 22 and 24 owing to the fact that the edges of said belt contact with the sides of the groove between the pulley discs 10 and 11 at a considerable distance from the center about which the discs rotate. If however the engine increases its speed the faster revolutions of the weights 43 of the governing apparatus will cause said weights to increase the diameter of their orbital paths, under the urge of centrifugal force, to act upon the cams 41, which will thereupon engage the adjacent face of the operating disc 27 and will slide said disc farther away from the spider 26, this sliding movement of the disc being resisted by the springs 39 of the toggle construction. This operation will be clearly understood when it is noted that, owing to the rods 28 forming a connection between the operating disc 27 and the hub portion 20 of the pulley disc 10, any movement of the operating disc away from the stationary pulley disc 11 will also tend to increase the space between said discs 10 and 11 consequently decreasing the operative diameter thereof. And furthermore such movement of the disc 10 will decrease the space between it and the spider 26 which will tend to increase the distance between the upper and lower pins 38 to which the springs 39 are secured.

When increased space between the discs 10 and 11 is secured as above stated, the belt B will approach more nearly to the center of rotation of the two part driving pulley 9 and consequently said belt will be driven at a sufficiently slower speed to compensate for the increase in the speed of the engine 1. However this compensation will not be due alone to the decreased operative diameter of the two part pulley 9, but will also be due in part to the increased diameter of the driven pulley construction 2. This last statement will be better understood when it is noted that a slackening of the belt B around the pulley construction 2 will occur, and this will permit the springs 15 to crowd the pulley discs 7 and 8 closer together thus wedging the portion of the belt which passes between said discs toward their periphery. Hence when the speed of the engine is increased there will take place a double compensation therefor, and it will be evident that when the speed of the engine decreases a like reverse double compensation therefor will take place.

In order to insure that the proper belt tension will be maintained in the belt B at all times, as well as a proper contact of said belt particularly with pulley parts 10 and 11, I find it advantageous to employ the use of an overrunning clutch or free wheeling unit 89 between the prime mover 1 and the intervening special changing mechanism 3 to compensate for irregularities produced by the fluctuating speed of the prime mover brought about on account of starting, stopping, speeding up, slowing down, or gear shifting, which would tend to otherwise make the drive inefficient or possibly inoperative. There are many conventional types of these devices extensively now in use.

There is claimed:

1. In a device of the kind described, a shaft, a pulley mounted on said shaft, said pulley being composed of parts one of which is rigidly mounted on said shaft and the other axially movable with relation thereto, a disc member loosely mounted on said shaft, a spider fixedly mounted on said shaft, means independent of one another connecting said disc member and said spider with the movable part of said pulley, the connecting means of the spider and movable pulley part comprising oppositely disposed sets of linkage, yieldable means connecting the joints of said linkage, and means initiated by centrifugal force fastened to said spider and acting against said disc member to expand the joints of said linkage in opposition to said yieldable means.

2. In a device of the kind described, a shaft, a pulley mounted on said shaft, said pulley being composed of two component parts one of which is rigidly mounted on said shaft and the other axially movable with relation thereto, a member rigidly mounted on said shaft in spaced relation to said stationary part, linkage pivotally connecting said member and said movable part, and means operatively related to said member to actuate said linkage whereby to vary the operative diameter of said pulley, said means including a governor actuable by centrifugal force.

3. In a device of the kind described, a shaft, a pulley mounted on said shaft, said pulley being composed of two component parts, one of said parts being fastened to said shaft and the other being movable axially thereof, a member rigidly mounted on said shaft in spaced relation to said stationary part, mechanisms independently operatively interconnecting said member and said movable part, one of said mechanisms comprising parts including spring controlled mechanism, the other of said mechanisms comprising contrifugally operated means including a disc and bars, said centrifugally operated means being the connecting medium whereby said member thru the medium of said disc and bars is interconnected with the movable part of said pulley and upon operation actuating the remaining parts of said mechanisms to vary the operative diameter of said pulley.

4. In a device of the kind described, a shaft, a pulley mounted on said shaft, said pulley being composed of two component parts, one of said parts being fastened to said shaft and the other being movable axially thereof, a member rigidly mounted on said shaft in spaced relation to said stationary part, expandible and contractible hinged mechanism interconnecting said member and said movable part, yieldable means connecting the joints of said hinged mechanism, and centrifugally operable means tending to expand said joints against the action of said springs.

5. In a device of the kind described, a shaft, a pulley mounted on said shaft, said pulley being composed of two component parts one of which is rigidly fastened to said shaft and the other axially movable with relation thereto, whereby the operative diameter of said pulley may be varied, a spider rigidly mounted on said shaft in spaced relation to the stationary part of said pulley, toggles connecting said spider and the movable part of said pulley, yieldable means connecting the joints of said toggles, a disc member slidably mounted on said shaft in spaced relation to said spider, means connecting said movable part and said disc member, and governors provided with counterweights pivotally mounted on said spider, said governors having a cam face engageable with said disc member to cause said disc to move longitudinally of said shaft whereby to retract said movable part against the action of said yieldable means as said counterweights are caused to increase their orbital path under the influence of centrifugal force.

6. In a device of the kind described, a shaft, a driven pulley mounted on said shaft, a second shaft, a driving pulley mounted on said second shaft, a power transmitting member led over said pulleys, a prime mover, an overrunning clutch interconnecting said driving pulley and said prime mover, said driving pulley being composed of two component parts, one of said parts being fastened to said second shaft and the other being movable axially thereof, actuating means for varying the effective diameter of said driving pulley by decreasing its diameter at the start and each acceleration of speed of said prime mover thereafter whereby to maintain said driven pulley at an approximately constant speed while the speed of said prime mover is permitted to vary comprising a member rigidly mounted on said second shaft in spaced relation to said stationary part, and mechanisms independently operatively interconnecting said member and said movable part, one of said mechanisms including parts whose automatism is controlled by centrifugal force and the other of said mechanisms including spring controlled elements, said spring controlled elements remaining passive during the performance of the centrifugally controlled parts.

7. The combination with a constantly varying speed prime mover including an overrunning clutch or free wheeling unit, of intervening mechanism connected to said prime mover thru the medium of said overrunning clutch, secondary apparatus, driving means comprising a segmental V-shaped belt interconnecting said secondary apparatus and said intervening mechanism, said secondary apparatus and said intervening mechanism comprising respectively a pair of driven and driving pulleys having conically shaped flanges forming a V-shaped surface upon which the sides of said driving means ride and contact at all times during the operation of said pulleys, yieldable means to intermesh the flanges of each pair of said pulleys whereby the effective diameter of said driving means led thereover may be varied, said driving means causing the flanges of said driving pulley to spread apart as a pull is exerted on said driving means by the rotation of said driving pulley at slow speed starting, the pull on said belt temporarily overcoming the yieldable opposition of said yieldable means directed thereagainst, and means comprising companion mechanisms structurally separate from one another actuated by said prime mover to initially automatically spread the flanges of said driving pulley apart when said intervening mechanism picks up speed whereby to decrease the effective diameter of said driving means led thereover as the speed of said prime mover is accelerated, and to increase the effective diameter of said driving means as the speed of said prime mover is decelerated, one of said companion mechanisms including elements whose automatism is controlled by centrifugal force and such elements being temporarily separated from the remainder of said one companion mechanism at the time said slow speed starting occurs and the other of said mechanisms comprising elements controlled by said yieldable means, the latter elements remaining otherwise passive while the centrifugally controlled elements perform their respective function.

8. In combination, a driving shaft, a pulley mounted on said shaft, a driven shaft, a pulley mounted on said driven shaft, flexible power transmitting means looped over said pulleys, said pulleys being composed of two component parts one of which is stationary and the other movable axially with relation thereto, and two cooperative structurally independent sets of alternate functioning mechanisms, operatively related to said driving shaft and the movable part of said driving pulley whereby the speed of said driven shaft is maintained approximately constant, one of said sets of mechanisms comprising centrifugally controlled elements and the other comprising spring controlled elements, the spring controlled elements except for the spring portion thereof remaining passive during the performance of the centrifugally controlled elements, and the centrifugally controlled elements remaining passive at certain stages of the performance of the spring controlled elements.

9. In combination, secondary apparatus including a driven shaft, and an expandible and contractible pulley mounted on said driven shaft having conically shaped intermeshing flanges to form a V-shaped belt race, spring means tending to intermesh said flanges, intervening mechanism including a driving shaft, and an expandible and contractible pulley mounted on said driving shaft having conically shaped flanges to form a V-shaped belt race, a segmentally V-shaped flexible belt looped over the V-shaped races of said pulleys, the pull on said belt as its sides frictionally contact the flanges of the V race causing the flanges of said driven pulley to recede apart against the action of said spring, a prime mover, mechanism interconnecting said prime mover and said intervening mechanism, said prime mover having a constantly varying speed, structurally independent pairs of mechanisms operatively related to said driving pulley, the loaded belt decreasing the operative diameter of said driving pulley at periods of starting and sudden acceleration of said prime mover, and centrifugally operated means operatively related to one of said mechanisms and controlled by the speed of said prime mover after said driving shaft picks up speed to maintain an approximate constant speed of said driven shaft.

10. In a device of the kind described, a shaft, a pulley mounted on said shaft, said pulley being composed of two component parts, one of said parts being fastened to said shaft and the other movable axially thereof, a movable member and a fixed member mounted on said shaft in spaced relation to said pulley, mechanisms independent of one another interconnecting said movable member and said fixed member with the movable part of said pulley, and centrifugally operated means connected to said fixed member and operatively related to said movable member to automatically actuate one of said mechanisms to vary the operative diameter of said pulley.

11. In a device of the kind described, a shaft, a pulley mounted on said shaft, said pulley being composed of two component parts, one of said parts being fastened to said shaft and the other movable axially thereof, a movable member and a fixed member mounted on said shaft in spaced relation to said pulley, expandible and contractible hinged mechanism and fixed mechanism independently interconnecting said fixed member and said movable member with the movable part of said pulley, yieldable means connecting the joints of said hinged mechanism, and centrifugally operable means connected to said fixed member to actuate said movable member whereby to expand said joints against the action of said springs.

12. A constant speed controlled drive comprising a driving pulley and a driven pulley having changing diameters, power transmitting means engaging said pulleys, a prime mover to drive said driving pulley, and means actuated by said prime mover for automatically decreasing the operative diameter of said driving pulley, said means comprising cooperative sets of independent mechanisms whose automatism is controlled by centrifugal force, one of said sets of mechanisms including springs, the other parts of the latter of said one mechanism besides said springs remaining passive during the functioning of the other of said mechanisms, said other mechanism decreasing the driving pulley's diameter after the latter has picked up speed, and at slow speed starting said power transmitting means initially automatically decreasing the effective diameter of said driving pulley and both sets of mechanisms besides said springs remaining passive during such performance.

13. In a constant speed controlled drive, a driving pulley and a driven pulley, each of said pulleys having belt engaging flanges capable of receding and approaching each other, propelling means engaging said flanges, a variable speed prime mover, and means, comprising co-acting sets of centrifugally controlled elements and spring controlled elements, operatively relating said prime mover and said driving pulley to cause the effective diameter of said driving pulley, other than at starting and sudden periods of acceleration, to diminish as the speed of said prime mover increases and increase as the speed of said prime mover decreases, said propelling means temporarily at starting and sudden periods of acceleration receding the flanges of said driving pulley in advance of the initial spreading caused by the subsequent operation of said centrifugally controlled elements.

14. In a constant speed controlled drive, a driven shaft, a driving shaft, an expandible driven pulley mounted on said driven shaft, an expandible driving pulley comprising a movable part and a stationary part mounted on said driving shaft, driving means connecting the driven pulley with the driving pulley, a variable speed prime mover for rotating said driving pulley at a variable speed and said driven pulley, thru the medium of said driving means, at a constant speed, and mechanism operatively related to said driving pulley whereby as the speed of said prime mover is accelerated, the movable part of said driving pulley is caused to initially recede from the stationary part thereof to decrease the effective diameter of said driving pulley in compensating for the increased speed of the said driving shaft created by said prime mover, said mechanism comprising centrifugally controlled elements and spring controlled elements, said centrifugally controlled elements causing the driving pulley's diameter to decrease after the same picks up speed and the spring controlled elements remaining passive during such performance.

15. In a constant speed controlled drive, a driving shaft, a pulley composed of two component parts comprising a movable part and a stationary part mounted on said shaft, a prime mover connected to said shaft, and mechanisms structurally apart from one another connected to the movable part of said pulley to, upon accelerating the speed of said prime mover, cause a separation of the movable part of said pulley from the stationary part thereof, said mechanisms comprising centrifugally controlled elements and spring controlled elements, the latter elements except for the spring portion remaining passive during the performance of the other.

16. In a constant speed controlled drive, a driving shaft, a pulley composed of two component parts comprising a movable part and a stationary part mounted on said shaft, a prime mover connected to said shaft, and centrifugally and spring controlled elements operatively connected to the movable part of said pulley to upon accelerating the speed of said prime mover cause the movable part of said pulley to recede from the stationary part thereof to initially decrease its effective diameter, the spring controlled elements remaining passive during the performance of the centrifugal controlled elements in causing such recession.

17. In a constant speed controlled drive, a support, an actuator, said actuator comprising two companion parts, each of said parts having a driving connection with said support and one part having a movable relation with its companion part, a member having a driving connection with said support, and pairs of toggles, connected by springs, connecting said member and said movable part.

18. In a constant speed controlled drive, a support, an actuator, said actuator comprising two companion parts, each of said parts having a driving connection with said support and one part having a movable relation with its companion part, a member having a driving connection with said support, and pairs of toggles, whose elbows are yieldably connected, connecting said member and said movable part.

19. In a constant speed controlled drive, a support, an actuator, said actuator comprising two companion parts, each of said parts having a driving connection with said support and one part having a movable relation with its companion part, a member having a driving connection with said support, and hinged mechanisms, having their joints yieldably connected, pivotally connecting said member and said movable part.

20. In a constant speed controlled drive, a support, an actuator, said actuator comprising two companion parts, each of said parts having a driving connection with said support and one part having a movable relation with its companion part, a member having a driving connection with said support, a knee joint pivotally connecting said member and said movable part, means having a slidable relation with said support connected to and movable in unison with the movable part of said actuator, and centrifugally operated means connected to said member and kneed against said means to bend said knee joint.

21. In a constant speed controlled drive, a support, an actuator, said actuator comprising two companion parts, each of said parts having a driving connection with said support and one part having a movable relation with its companion part, a member having a driving connection with said support, means having a slidable relation with said support connected to and movable in unison with the movable part of said actuator, and centrifugally operated means having a pivotal relation with said member kneed against said means to upon rotating said support and at every period of its acceleration cause a separation of said movable part from its companion part.

22. In a constant speed controlled drive, a support, an actuator, said actuator comprising two companion parts, each of said parts having a driving connection with said support and one part having a movable relation with its companion part, a member having a driving connection with said support, comprising a disc and longitudinally extending bars connecting said disc with the movable part of said actuator, and centrifugally operated means having a pivotal relation with said member kneed against said disc whereby to initially upon rotating said support and at each period of its acceleration cause a separation of said movable part from its companion part.

23. A constant speed controlled drive comprising a driving pulley and a driven pulley each composed of relatively spreadable apart pulley sections forming a V-crotch belt race, one section of which is spring opposed, power transmitting means engaging the sides of said pulley sections at all times during the spread of a spring opposed section to and from its companion section, a prime mover to drive said driving pulley, and means comprising centrifugally controlled elements and spring controlled elements to regulate the operative diameter of said driving pulley whereby the speed of said driven pulley is maintained constant, said centrifugal controlled elements, at other than slow speed starting, thru the medium of said prime mover initially automatically decreasing the operative diameter of said driving pulley while said spring controlled elements during such performance remain passive.

24. A constant speed controlled drive comprising a driving pulley and a driven pulley, each of said pulleys comprising spreadable apart pulley sections forming with each other a V-crotch, power transmitting means having tapering sides engaging at all times the sides of said pulley sections forming said crotch during the spreading of said pulley sections to and from each other, a prime mover to drive said driving pulley, the pull on said power transmitting means at the period of slow speed starting of said prime mover causing the movable pulley section of said driving pulley to spread apart against the action of its spring opposition, centrifugally controlled elements and spring controlled elements operatively related to each other and the combination of the two latter said elements to the movable pulley section of said driving pulley, said centrifugally controlled elements temporarily remaining passive during the initial spread caused by the power transmitting means during the interim of slow speed starting.

25. In a device of the kind described, a support, an actuator, said actuator comprising two companion parts, each of said parts having a driving connection with said support and one part having a movable relation with its companion part, a slidable member mounted on said support, means connecting said slidable member and the movable part of said actuator whereby they are moved in union, a member having a driving connection with said support, centrifugally controlled elements pivotally connected to said member, said elements each having a cam face engaging said slidable member, means to rotate said support and in turn said actuator, and means to initially upon the rotating of said support to move the movable part of said actuator and in turn said slidable part whereby to temporarily separate the cam face of the centrifugal controlled elements from said slidable member against which it normally abuts, thereby permitting expansion of centrifugally controlled elements without constraint.

CHARLES J. MEYERS.